US009921453B2

United States Patent
Tiecke et al.

(10) Patent No.: US 9,921,453 B2
(45) Date of Patent: *Mar. 20, 2018

(54) MULTIDIRECTIONAL COMMUNICATION SYSTEM

(71) Applicant: Facebook, Inc., Menlo Park, CA (US)

(72) Inventors: Tobias Gerard Tiecke, Menlo Park, CA (US); Kevin Jerome Quirk, Los Altos, CA (US); Yael Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,190

(22) Filed: Nov. 29, 2016

(65) Prior Publication Data

US 2017/0075191 A1     Mar. 16, 2017

Related U.S. Application Data

(63) Continuation of application No. 14/822,677, filed on Aug. 10, 2015, now Pat. No. 9,544,054.

(51) Int. Cl.
*H04B 10/116* (2013.01)
*G02F 1/365* (2006.01)

(52) U.S. Cl.
CPC ........... *G02F 1/365* (2013.01); *H04B 10/116* (2013.01); *G02F 2201/346* (2013.01)

(58) Field of Classification Search
CPC .. H04B 10/116; G02F 1/365; G02F 2201/346
USPC ....................................... 398/118
See application file for complete search history.

(56) References Cited

U.S. PATENT DOCUMENTS

| 5,844,674 A | * | 12/1998 | Sieben | G06F 3/0304 |
| | | | | 356/139.03 |
| 9,544,054 B1 | | 1/2017 | Tiecke et al. | |
| 2016/0163283 A1 | * | 6/2016 | Chang | G02B 27/0172 |
| | | | | 345/633 |
| 2016/0165151 A1 | * | 6/2016 | Corlett | G02B 27/017 |
| | | | | 348/164 |

OTHER PUBLICATIONS

Notice of Allowance dated Oct. 4, 2016, for U.S. Appl. No. 14/822,677 by Tiecke, T. et al., filed Aug. 10, 2015.

(Continued)

*Primary Examiner* — Dalzid Singh
(74) *Attorney, Agent, or Firm* — Perkins Coie LLP (57) ABSTRACT

Various of the disclosed embodiments incorporate wavelength-shifting (WLS) materials to facilitate high data rate communication. Some embodiments employ a waveguide incorporating such WLS materials to receive a wireless signal from a source. The signal may be, e.g., in the optical or ultraviolet ranges, facilitating a ~10 Gbps data rate. Because the WLS material is sensitive in all directions, the source may be isotropic or wide-angled. The WLS material may be shaped into one or more "bands" that may cover an object, e.g., a head-mounted display. A detector may be coupled with the bands to receive the wavelength-shifted signal and to recover the original signal from the source. The WLS material may be modified to improve the waveguide retention, e.g., by incorporating layers of material having a different reflection coefficient or a Bragg reflector.

34 Claims, 9 Drawing Sheets

(56) References Cited

OTHER PUBLICATIONS

U.S. Appl. No. 14/822,677 by Tiecke, T., et al., filed Aug. 10, 2015.
Voge, M. et al., "Wavelength Shifters as (new) light sensors." PINGU workshop, Amsterdam, Mar. 2011, pp. 1-30.

* cited by examiner

MULTIDIRECTIONAL COMMUNICATION SYSTEM

CROSS-REFERENCES TO RELATED APPLICATIONS

This application is a continuation of commonly assigned U.S. patent application Ser. No. 14/822,677, filed on Aug. 10, 2015, and entitled "MULTIDIRECTIONAL COMMUNICATION SYSTEM," the disclosure of which is hereby incorporated herein in its entirety by reference.

TECHNICAL FIELD

The disclosed embodiments relate to systems and materials for reception of wireless signals.

BACKGROUND

Systems that require a high data rate connection between two devices typically utilize a wired communication link. However, a wired communication link limits the range of motion of a user in systems where mobility is also required (e.g., in virtual or augmented reality systems). One possible solution is to use a high data rate radio-frequency (RF) communication link. Although conventional high data rate RF communication links (e.g., IEEE 802.11ac, IEEE 802.11ad) may be suitable for some applications, virtual or augmented reality systems often require multi-gigabits-per-second (Gbps) links, to provide the best viewing experience. Another possible solution is to use a multi-Gbps free-space optical communication link. However, conventional free-space optical communication links use a combination of optics and small area photodiodes as receivers, which require a very high degree of pointing and tracking accuracy. Constraining the user or the design architecture to accommodate reception in such a system severely limits the system's flexibility.

Accordingly, there exists a need for devices capable of receiving high data rate communications without imposing onerous restrictions on the system or user.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

While the flow and sequence diagrams presented herein show an organization designed to make them more comprehensible to a human reader, those skilled in the art will appreciate that actual data structures used to store this information may differ from what is shown in that they, for example, may be organized in a different manner, may contain more or less information than shown, may be compressed and/or encrypted, etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Some embodiments incorporate wavelength-shifting (WLS) materials in a wireless receiver to facilitate high data rate communication. In these embodiments, the WLS material acts as a waveguide to receive a wireless signal from a source and guide the received signal to a detector of the wireless receiver. For clarity, the term "wireless signal," except where indicated otherwise, refers herein to any photon-based electromagnetic radiation signal transmitted without wires. In some embodiments, such as the embodiments described herein, use visible wavelengths (approximately 375 nanometers to 700 nanometers) or near-visible wavelengths (approximately 100 microns to 700 nanometers), radio-frequency wavelengths, microwave wavelengths, or millimeter wavelengths. A wireless signal in the visible or ultraviolet ranges may facilitate a ~10 Gbps data rate. Because the WLS material is sensitive in a large range of incidence angles, the signal received at the WLS material is independent of the orientation of the WLS material with respect to the source. Additionally, the source may be isotropic or wide-angled. In some embodiments, the WLS material is shaped into flexible sheets or bands that may conform to the shape of an object on which the WLS material is to be attached. For example, the WLS material may be shaped into one or more sheets or bands that are attached to a virtual reality head-mounted display. A detector may be coupled with the WLS material to receive the wavelength-shifted signal and to recover the original signal from the source. The WLS material may be modified to improve the waveguide retention, e.g., by incorporating layers of material having a different reflection coefficient or a Bragg reflector. The wireless receiver and the WLS material are described in more detail below.

Although the following discussion refers to the WLS receiver being coupled to a head-mounted display for a virtual or augmented reality system, the WLS receiver may be used in other systems. For example, the WLS receiver may be used in devices coupled to other parts of the body (e.g., clothing). Similarly, the WLS receiver may be used for stationary applications (e.g., point-to-point communications) where the WLS is mounted on a stationary object (e.g., table-mounted, tower-mounted, or wall-mounted).

Furthermore, the term "photon" is used to refer to a photon of electromagnetic radiation. For example, the photon may be a photon of light (e.g., visible or near-visible light). Similarly, the photon may be a photon of radio-frequency, microwave, or millimeter-wave electromagnetic radiation.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Applications

Figure 1A:
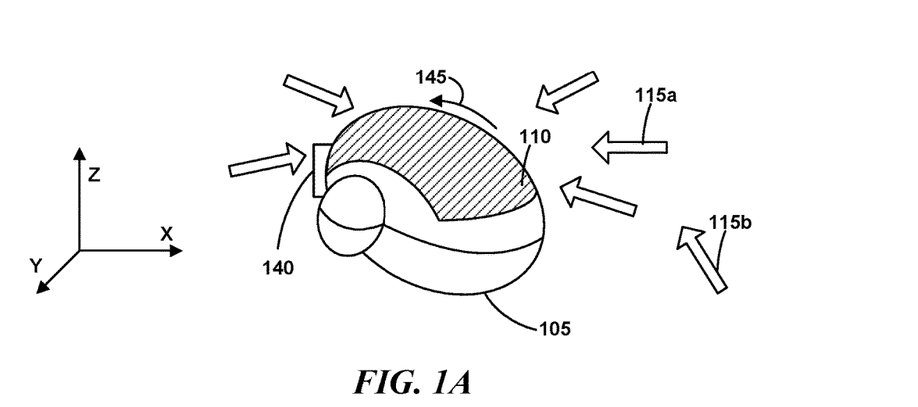
FIG. 1A illustrates an example application of a headset for virtual or augmented reality, in accordance with some embodiments.

FIG. 1A illustrates an example application of a head-mounted display (HMD) 105 for a virtual or an augmented reality system, in accordance with some embodiments. In some embodiments, a portion of the HMD 105 includes a WLS material 110. For example, the WLS material 110 may be coupled to the surface of the HMD 105. Photons having wavelengths in a first wavelength band that are incident on the WLS material 110 are absorbed by the WLS material 110 and emitted as photons having wavelengths in a second wavelength band. The photons having a wavelength in the second wavelength band are directed (e.g., reflected internally within the WLS material 110) along a path 145 to a detector 140 located on the HMD 105. Since the WLS material 110 is able to receive photons having wavelengths in the first wavelength band at a large range of incidence angles 115*a*, 115*b* and directs the photons having wavelengths in the second wavelength band to the detector 140, a user wearing the HMD 105 is able to move the HMD 105 in different orientations with respect to a transmitter of a host system while still maintaining a reliable wireless signal. One will recognize that the form factor depicted herein is merely an example and that the WLS material 110 may cover a smaller or larger portion of the head mounted system or may be separately connected (e.g., via a vest or attachment worn by the user). For example, multiple strips or bands of WLS materials 110 may be coupled to various locations on the HMD 105 (e.g., on the top, sides, and back of the HMD 105) and coupled to the detector 140. In doing so, the range of motion of the HMD 105 with respect to the transmitter of the host system is increased, thus allowing the user of the HMD 105 to move more freely without losing the wireless signal. Similarly, the embodiments described herein are not restricted to head-mounted displays and may appear on clothing, watches, accessories, vehicles, satellites, towers, etc. Furthermore, the embodiments described herein may be used in stationary applications where the orientation of the wireless receiver does not change relative to the transmitter of the host system. The availability of a large area and fast detector may strongly reduce the source's pointing accuracy requirements.

Figure 1B:
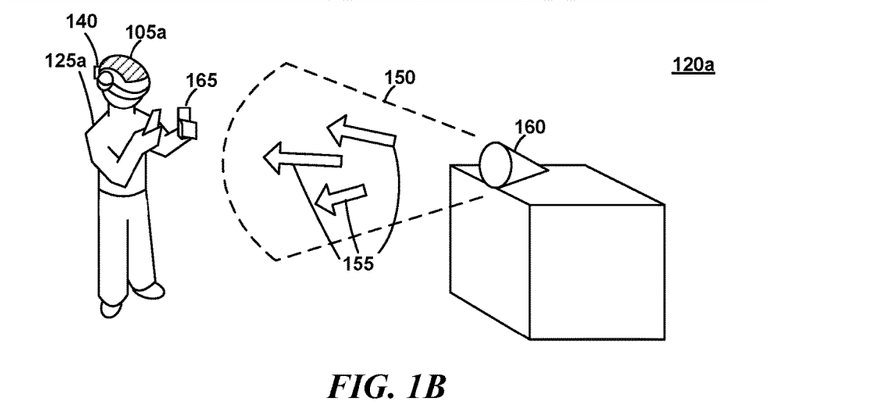
FIG. 1B illustrates an example application where a user with a virtual headset receives directional wireless data from a source in accordance with some embodiments.

FIG. 1B illustrates an example application where a user 125*a* with an HMD 105 receives a directional wireless signal from a source 160. Unlike conventional free-space optical communication links, a beam 150 of photons 155 does not need to be precisely aimed at a small detector on the HMD 105. Instead, the beam 150 may be transmitted in a wider pattern and still produce an adequate signal at the detector 140. The wider pattern allows the HMD 105 to move relative to the source 160 while still receiving an adequate signal at the detector and without requiring precise aiming of the beam 150 at the detector 140.

Figure 1C:
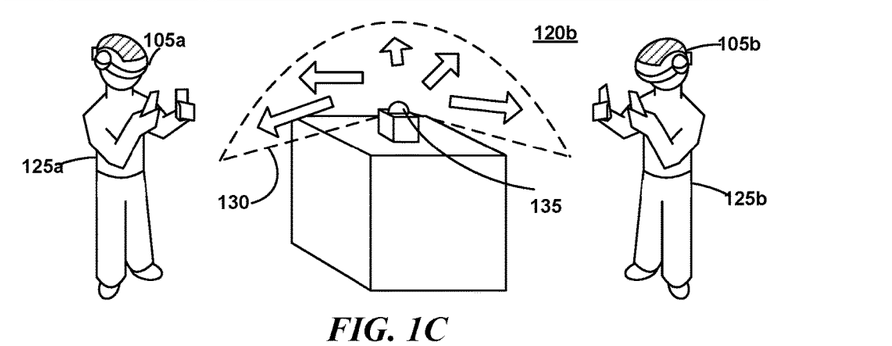
FIG. 1C illustrates an example application where a plurality of users with virtual headsets receive wireless data from a single source or multiple sources in accordance with some embodiments.

FIG. 1C illustrates an example application where a plurality of users 125*a*, 125*b* with HMDs 105*a*, 105*b* receive wireless data from a source 135. In some embodiments, the source 135 may produce an isotropic or hemispherical distribution pattern 130. Even with such a broad distribution pattern 130, because the WLS material 110 facilitates photon reception at a wide variety of incident angles, each HMD 105*a*, 105*b* may continue to receive an adequate signal. Thus, the system may not only be used in a single source-receiver system, but may also be used in a system where there is at least one source and multiple receivers receiving the same signal. Data rate communications at, e.g., optical or ultraviolet frequencies, that are higher than would be possible at radio frequencies may be transmitted and received from a wide variety of directions via various of the disclosed embodiments.

In some embodiments, the source 135 produces a directional signal to each of the HMDs 105*a* and 105*b*. In these embodiments, each directional signal is separately addressed to either HMD 105*a* or 105*b*. Accordingly, each headset 105*a* and 105*b* may receive the same or different data (e.g., a scene in a virtual world customized for each user 125*a* and 125*b* based on the position of the user 125*a* and 125*b* in the room and the direction that the HMDs 105*a* and 105*b* are oriented). Since the WLS material 110 is able to receive photons at a wide variety of incident angles, the tracking requirements in order to send the directional signal to the HMDs 105*a* and 105*b* may be substantially reduced as compared to conventional free-space optical communication systems.

Note that although FIG. 1C illustrates the source 135 being placed in a location above the users 125*a* and 125*b*

(e.g., mounted on a ceiling), the source 135 may be mounted in any location relative to the users. For example, the source 135 may be mounted or placed on walls, tripods, stands, shelves, tables, chairs, etc.

Figure 1D:
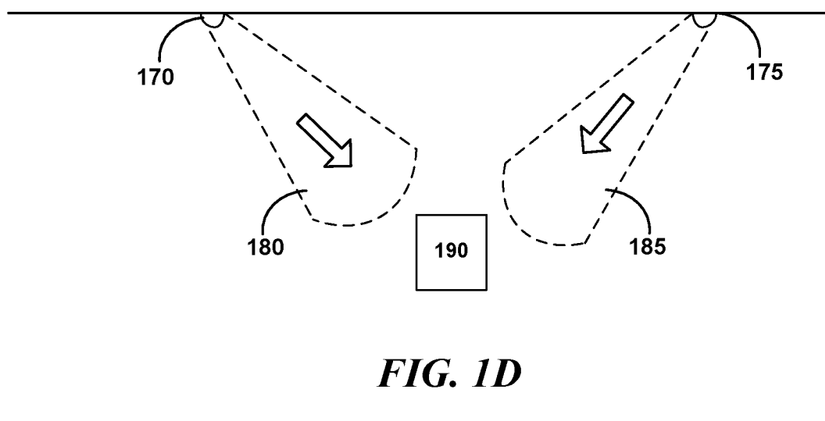
FIG. 1D illustrates an example application where multiple light sources are used as transmitters, in accordance with some embodiments.

FIG. 1D illustrates an example application where light sources 170 and 175 for lighting are used as transmitters, in accordance with some embodiments. In these embodiments, the light sources 170 and 175 are not only used to provide lighting, but are also used to transmit photons encoding data to a WLS receiver 190. In some embodiments, one or more wavelength bands produced by the light sources 170 and 175 are used to transmit data to the WLS receiver 190. For example, the light sources 170 and 175 may produce white light, but use the blue wavelength band to transmit data to the WLS receiver 190. In some embodiments, the light sources 170 and 175 use multiple non-overlapping wavelength bands to transmit different data streams to the WLS receiver 190.

As illustrated in FIG. 1D, the light sources 170 and 175 produce directional beams 180 and 185, respectively that point in the direction of the WLS receiver 190. Although the directional beams 180 and 185 are directed to the WLS receiver 190, in general, the directional beams 180 and 185 may be pointed in different directions. For example, the directional beams 180 and 185 may be pointed at stationary WLS receivers in the room (e.g., one WLS receiver coupled to a desktop computer and another WLS receiver coupled to a television set on the other side of the room). In some embodiments, the light sources 170 and 175 produce omnidirectional beams. In these embodiments, the light sources 170 and 175 may broadcast the same data to multiple WLS receivers (e.g., to provide Internet connectivity, to broadcast music or movies to devices, etc.).

In some embodiments, each light source 170 and 175 transmits data in non-overlapping wavelength bands so that multiple WLS receivers (or a single WLS receiver that can receive data in multiple wavelength bands) may receive different data streams.

Note that although FIG. 1D illustrates the light sources 170 and 175 being mounted above the WLS receiver 190 (e.g., mounted on a ceiling), the light sources 170 and 175 may be placed in other locations and/or fixtures. For example, the light sources 170 and 175 may be mounted in desktop lamps, recessed lighting fixtures, track lighting fixtures, and the like.

Note that the discussion above illustrates only a few example applications of using a WLS receiver and is not meant to limit the scope of the disclosed embodiments to the example applications described herein.

In some embodiments, multiple sources (e.g., the source 160, the source 135, the light sources 170 and 175) are placed in multiple locations in a room (or other venue) for diversity. Doing so increases the likelihood that the WLS material 110 and/or the WLS receiver 190 will receive photons from at least one source even when photons from a particular source cannot reach the WLS material 110 and/or the WLS receiver 190 (e.g., the WLS material 110 and/or the WLS receiver 190 is not facing the general direction of the source).

Overview—Example Structure

WLS materials' wavelength-shifting properties may facilitate a material that is both strongly absorbing in a first wavelength band and simultaneously non-absorbing outside of the first wavelength band such that the photons emitted by the WLS material are not absorbed. Various embodiments take advantage of the WLS materials' speed of wavelength conversion and collection efficiency to implement an improved communications receiver system.

Figure 2:
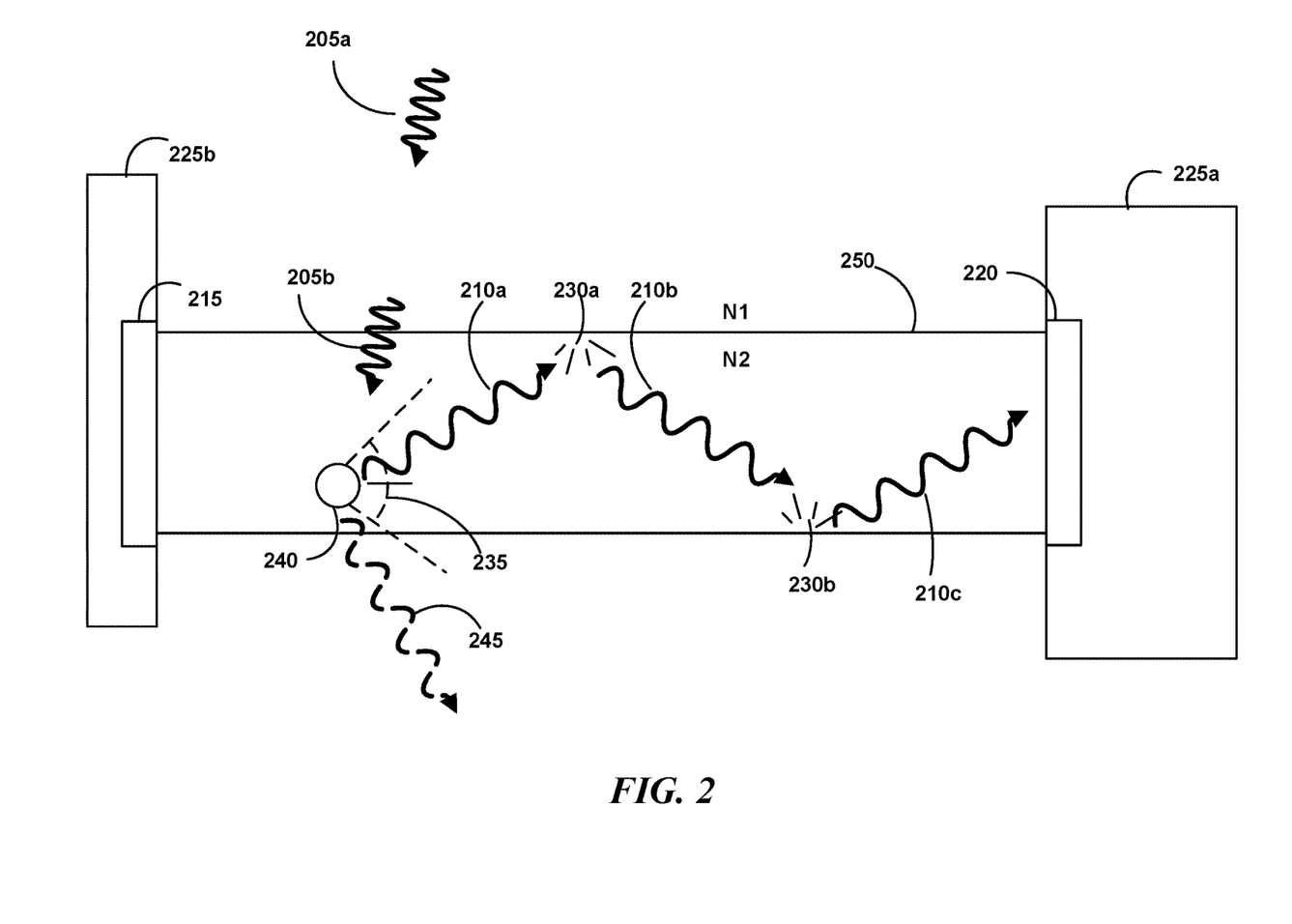
FIG. 2 is a schematic representation of a photon entering a wavelength shifting (WLS) material, in accordance with some embodiments.

FIG. 2 is a schematic representation of a photon 205a entering a WLS material 250, in accordance with some embodiments (one will recognize that the particulars of the quantum behavior are generalized/abstracted in this description to facilitate comprehension of the innovative higher level structure and application of the WLS material). The WLS material 250 may be curved and/or flexible in some embodiments and may be composed of one or more fibers. The photon 205a may be at a wavelength in a first wavelength band (e.g., ultraviolet or blue). The photon 205a may enter the WLS material 250 where it may eventually encounter a WLS particle 240 in the WLS material 250. The WLS particle 240 is configured to absorb and emit photons having wavelengths in specified wavelength bands. For example, the particle 240 may include dye molecules, quantum dots, lattice defects, fluorophores, and the like. In general, the WLS material 250 may be a solid that includes the WLS particles 240, a liquid contained in a container (e.g., glass) that includes dissolved WLS particles 240, or a gas contained in a vessel that includes gaseous-form WLS particles 240. In some embodiments, the WLS particle 240 is resistant to ionizing radiation. In the example illustrated in FIG. 2, the WLS particle 240 is configured to absorb photons having a wavelength in the first wavelength band. Accordingly, there is a high probability that the incoming photon 205a will be absorbed by the WLS particle 240. The WLS particle 240 then emits one or more photons 210a having wavelengths in a second wavelength band (e.g., green). Because the WLS particle 240 is not configured for absorption of photons having wavelengths in the second wavelength band, the photon 210a is unlikely to be subsequently absorbed by the WLS material 250. Since the WLS material 250 has a larger refractive index (e.g., 1.5) than the surrounding air/vacuum, the WLS material 250 acts as a waveguide that internally reflects (guides, directs, or otherwise confines) the emitted photons 210a (when emitted at an appropriate angle). The photons 210a internally reflect to the detector 220.

If the photon 210a is emitted outside an angle 235 corresponding to the refraction indices of air N1 and of the WLS material N2, the photon 210a may exit 245 the WLS material 250. However, a photon 210a emitted within the angle 235 is more likely to be internally reflected 230a, 230b, before encountering the detector 220. In some embodiments a mirror 215 may be placed on the opposing end to ensure that photons arrive at the detector 220. In some embodiments, the WLS material 250 may form a "circle" and both ends 225a and 225b may be coupled to the detector 220. Where the WLS material 250 is flexible, the material may "wrap around" to form, e.g., a head band or similar structure. Thus, in some embodiments, photons may be detected at either end of the WLS material 250.

Regarding the speed of the wavelength conversion, since the decay process is an exponential process, the transfer function of the wavelength-shifting material can be modeled as a low-pass filter (strictly speaking, the process is not exactly exponential since arrival times of the single photon level yields jitter, but the limit for many photons approaches the exponential approximation). Accordingly, the RC time of the filter may be set by the exponential time constant of this material. For example, commercially available wavelength-shifting plastics can have a time constant of one to two nanoseconds. However, as discussed herein, various embodiments contemplate modifications to produce even faster materials.

Regarding collection efficiency, since the wavelength-shifted photons are emitted isotropically from the WLS particle 240, there is non-zero probability that the photons are being captured. This probability may be determined by the critical angle for total internal reflection. Many present-day materials have low capture efficiencies of approximately 5% per direction.

Figure 3:
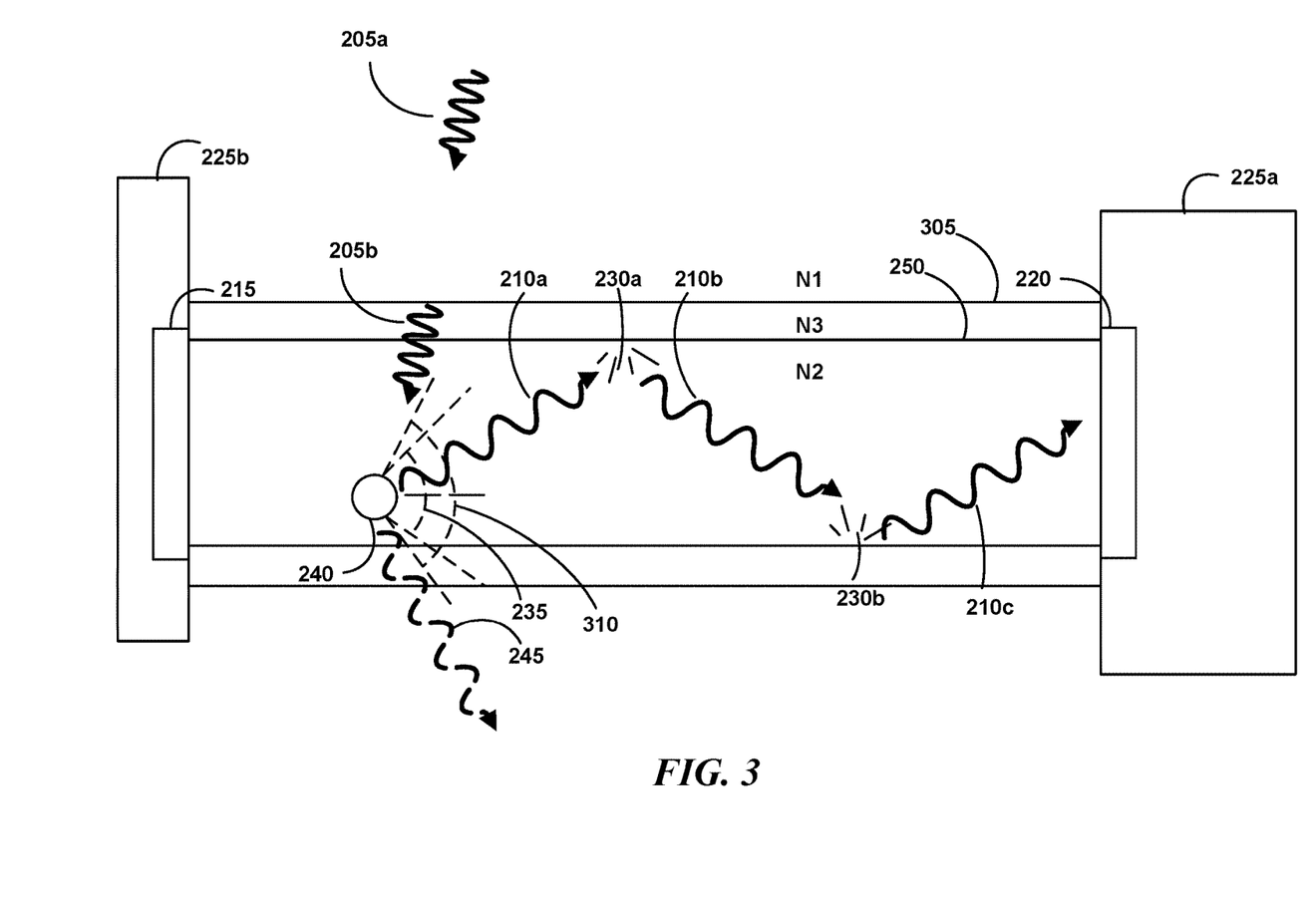
FIG. 3 is a schematic representation of a photon entering a WLS material including an additional layer with refractive index (N3) different from that of a core (N2) in accordance with some embodiments.

FIG. 3 is a schematic representation of the photon 205*a* entering a WLS material 250 including an additional layer with a refractive index N3 305, in accordance with some embodiments. Different indices N1 and N2 may suffice to produce an angle 235 at which emitted photons 210*a* are internally reflected. By applying an additional layer 305 having index of refraction N3, the photons 205*b* may enter the WLS material 250 via relative indices N1-N3 and N3-N2 and then have corresponding emitted photons 210*a* internally reflected via N2-N3. This may have the effect of broadening the angle for internal reflection to angle 310, with the consequence that a greater number of photons arrive at the detector 220. Additionally, the refractive indices of these layers can be configured to act as an interference filter rejecting undesired frequencies of photon 205*a*.

Figure 4:
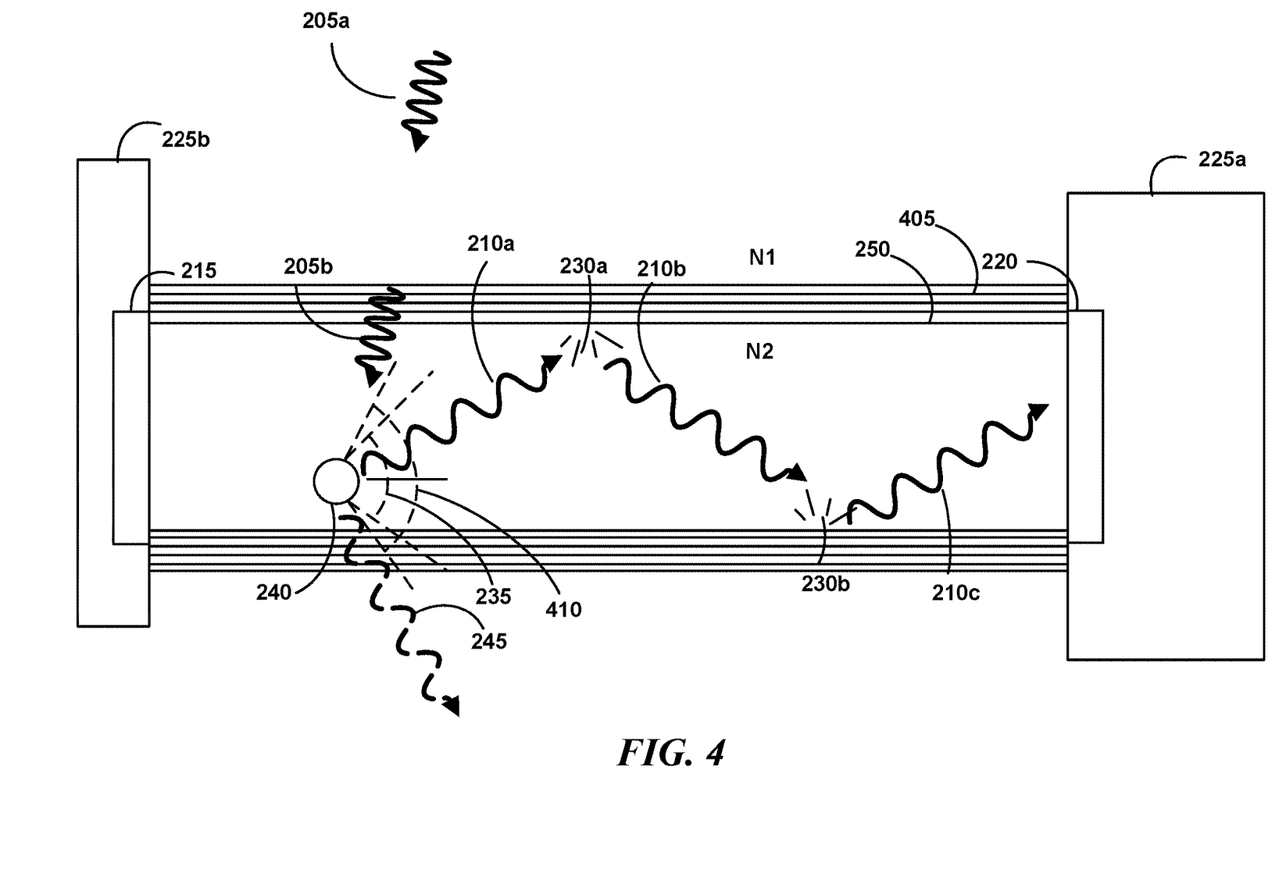
FIG. 4 is a schematic representation of a photon entering a WLS material including several additional layers with different refractive indices (e.g., as a Bragg reflector) in accordance with some embodiments.

FIG. 4 is a schematic representation of a photon entering a WLS material 250 including several additional index of refraction layers (e.g., as a Bragg reflector) in cladding 405, in accordance with some embodiments. This structure may be used to reject incident photons of particular wavelengths and to tailor the wavelength bands of photons that are confined within the WLS material 250. Accordingly, the remission angle 410 is broadened so that even more photons 210*a* are able to reach detector 220. Thus, the additional index of refraction layers in the cladding 405 may facilitate the use of multiple wavelengths. In some embodiments, the layers may be selected such that the reflective properties of different waveguides do not overlap, thereby narrowing the effective absorption/emission of the material and enabling wavelength division multiplexing with a single type of WLS material. Additional intermediate layers having other indices of refraction may be applied. The total internal reflection may be tailored to drastically improve the efficiency, e.g., up to several tens of percent. Note, however, that as the capture angle increases, the pulse spreading may also be increased (photons emitted at zero degrees arrive earlier than those emitted at a larger angle).

Some embodiments use WLS materials modified to provide faster absorption and re-emission times. For example, some embodiments may incorporate dye molecules, which can have fluorescence lifetimes down to 0.1 nanosecond or lower and may be tailored for many different wavelengths.

In some embodiments, the WLS material is tailored to enhance the emission of the WLS material, for example by imposing a periodic longitudinal variation in refractive index such as in a fiber Bragg grating. Doing so enhances the emission of the photons in the longitudinal direction, thereby reducing the angular spread of the emitted photons. This may be more favorable than using the additional index of refraction layers in the cladding 405, since it does not create pulse spreading and reduces the numerical aperture (NA) of the light emitted from the WLS material. A smaller NA enables the focusing photons on a smaller and therefore faster detector.

Example WLS Receiver Form Factors

Figure 5A:
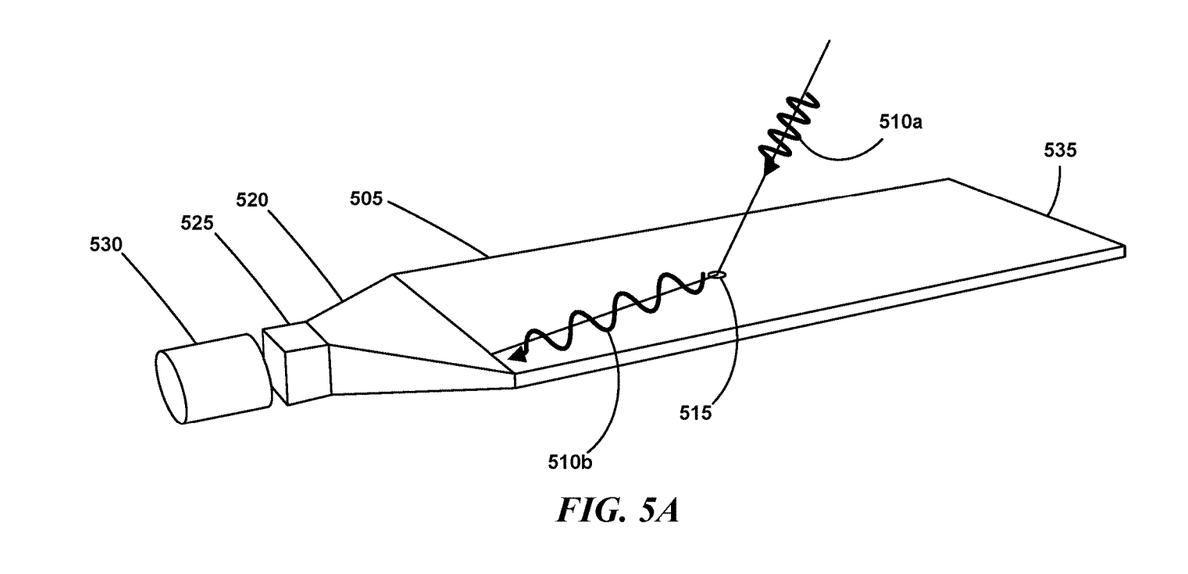
FIG. 5A is a concept form factor for a wireless receiver in accordance with some embodiments.

FIG. 5A is a concept form factor for a WLS receiver 505, in accordance with some embodiments. As discussed, a photon 510*a* having a wavelength in a first wavelength band may be absorbed 515 in a WLS material. A photon 510*b* having a wavelength in a second wavelength band is emitted. A tapered waveguide 520 may be used to direct the photon 510*b* to a cross-section 525 of the same area. A focusing element 530 may then focus the light, e.g., on a small area detector. In some embodiments, the focusing element includes a lens. In some embodiments, the focusing element includes a compound parabolic concentrator (CPC). In some embodiments, the focusing element includes another WLS material configured to absorb photons having wavelengths in the second wavelength band and emit photons in a third wavelength band. In these embodiments, the detector is configured to detect the photons having wavelengths in the third wavelength band. Note that in these embodiments, the WLS material may be configured to absorb and emit photons having wavelengths in multiple different (non-overlapping) wavelength bands. For example, the WLS material may include one or more types of WLS particles.

Figure 5B:
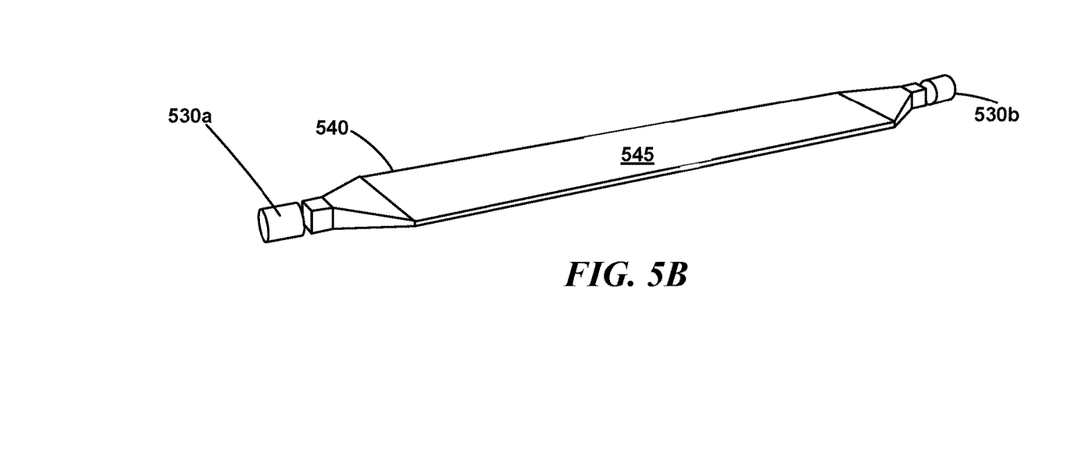
FIG. 5B illustrates a combined form factor constructed by joining two instances of the form factor of FIG. 5A, in accordance with some embodiments.

A reflective surface or second detector may be positioned at an edge 535. Alternatively, the edge 535 may be joined with a copy of the detector (making edge 535 contiguous) to form a combined structure. For example, FIG. 5B illustrates a combined form factor 540 constructed by joining two instances of the form factor 505 of FIG. 5A. Photons incident on the WLS material can then be detected at either of the detectors coupled with focusing elements 530*a* or 530*b*.

Figure 6A:
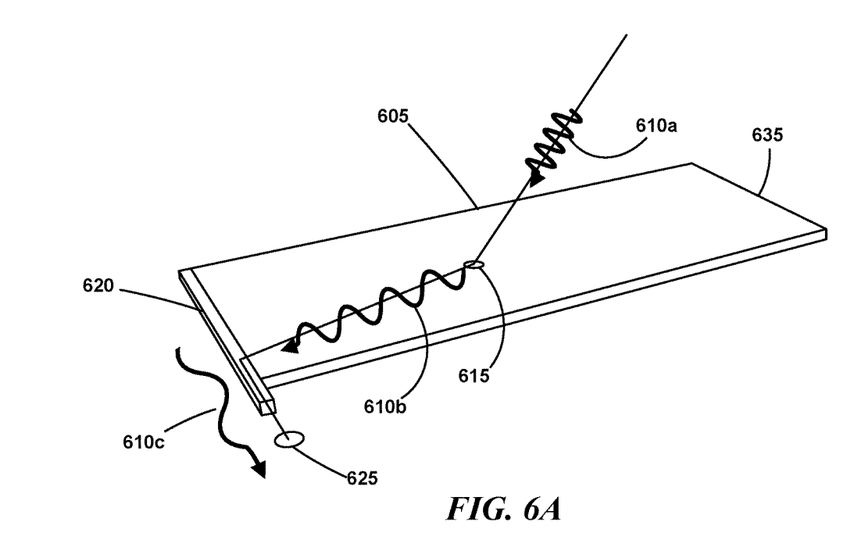
FIG. 6A is a concept form factor for a wireless receiver, in accordance with some embodiments.
Figure 6B:
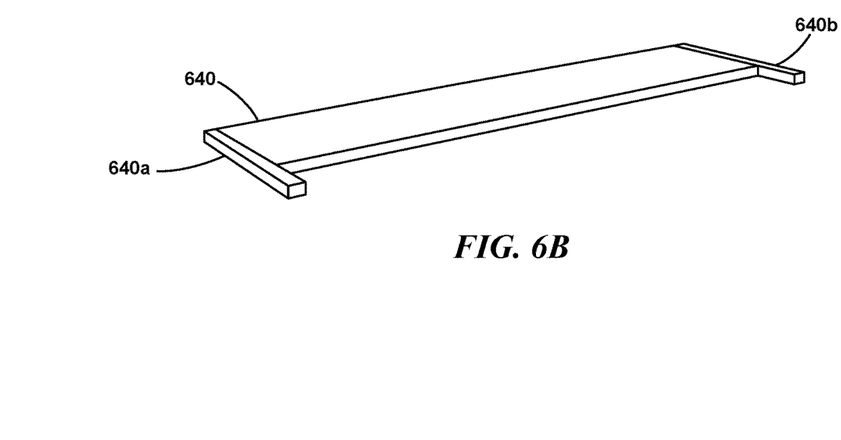
FIG. 6B illustrates a combined form factor constructed by joining two instances of the form factor of FIG. 6A, in accordance with some embodiments.

FIG. 6A is a concept form factor 635 for a WLS receiver in accordance with some embodiments. Again, a photon 610*a* having a wavelength in a first wavelength band may be absorbed by a WLS particle 615 in a WLS material 605. A photon 610*b* having a wavelength in a second wavelength band is emitted. The photon 610*b* may be guided (e.g., reflected or directed) in the WLS material 605 to a WLS material 620. The WLS material 620 may emit a photon 610*c* having a wavelength in a third wavelength band and guide the photon 610*c* to a detector 625 that is configured to detect photons having wavelengths in the third wavelength band. In these embodiments, the WLS material 620 acts as a focusing element to focus (direct or guide) the emitted photons to the detector. FIG. 6B illustrates a combined form factor 640 constructed by joining two instances of the form factor of FIG. 6A. The photons having a wavelength in the third wavelength band may be detected at the output of either WLS material 640*a* or WLS material 640*b*. In some embodiments, the WLS material lines the perimeter of the combined form factor 640. In some embodiments, the WLS receiver is circular and the WLS material lines the circumference of the WLS receiver. In these embodiments, the WLS material forms a shape that directs the photons having a wavelength in the third wavelength band to a detector. For example, the WLS material may be shaped to resemble the number six (i.e., "6") such that the photons travel from the circular WLS receiver (e.g., inside the loop of the number six) to the detector (e.g., at the "top" end of the number six) without encountering sharp bends.

Additional Contemplated Applications and Form Factors

In some embodiments, the plastic films of the WLS material may be very thin (e.g., hundreds of microns). This may permit the films to be made into foldable or flexible receivers. Such receivers may be used for satellite communications where space is at a premium. For example, the satellite may store a large unfoldable receiver such that the capture area can be much larger than the satellite size itself.

WLS materials may also be used in receivers as part of a hybrid link. For example, the WLS material may be part of an omnidirectional optical receiver combined with a conventional high data rate RF communication transmitter (e.g., IEEE 802.11ac, IEEE 802.11ad). This may be the case in virtual or augmented reality applications (or any streaming video) where an asymmetric link is typical.

Some embodiments use WLS materials in the visible or near-visible light wavelength bands. Some embodiments use WLS materials in radio-frequency wavelength bands. In these embodiments, the WLS material may be part of an omnidirectional antenna with an efficiency set by the absorption/re-emission process and its size. Some embodiments use WLS materials in the microwave wavelength or millimeter wavelength bands.

In some embodiments, the WLS receiver described herein is used in conjunction with a radio-frequency transmitter. In these embodiments, a client device that includes the WLS receiver may receive data encoded in electromagnetic radiation that is received from a host system (as described herein) and transmit data back to the host system using the radio-frequency transmitter. Accordingly, the WLS receiver receives high data rate data from the host system but transmits lower data rate data back to the host system. For example, in a virtual reality system, the host system may transmit, to the WLS material coupled to an HMD, high data rate video and audio data to be rendered in the HMD. The HMD may then transmit lower data rate HMD orientation data and/or user input data back to the host system using the radio-frequency transmitter.

For an outdoor link, atmospheric turbulence can be a significant source of degradation and often limits the performance of an optical communication system. The dominant effects of atmospheric turbulence on an optical signal are: frequency non-selective slow fading, limited seeing, and beam spreading and beam wander. The use of a WLS material (e.g., as described herein) as an alternative to traditional optics for the collecting aperture of a receiver in a turbulent channel has several advantages. As with other applications, the omnidirectional reception properties of the material obviate the need for a pointing and tracking system, which in this case is used to track the beam wander. In addition, when the aperture size is greater than the transverse coherence length of the channel, multiple spatial modes are incident on the WLS material, resulting in emission of photons with a longer wavelength, some percentage of which have an incidence angle with the cladding that allows them to be reflected by the cladding and then propagate along the waveguide. This removes all spatial and phase properties of the incident-received spatial modes and gives rise to a number of distinct non-coherent modes. For intensity modulated signaling, this results in a reduction in the severity of the frequency non-selective slow fading by reducing the variance of the received intensity and is known as aperture averaging. Compared to aperture averaging using traditional optics, this form of aperture averaging results in an additional detection efficiency loss; however, the spot size on the detector is now independent of the transverse coherence length (the amount of turbulence), and for high turbulence, it may allow the use of smaller (faster) detectors when lens speed is limited.

Example WLS Receiver

Figure 7:
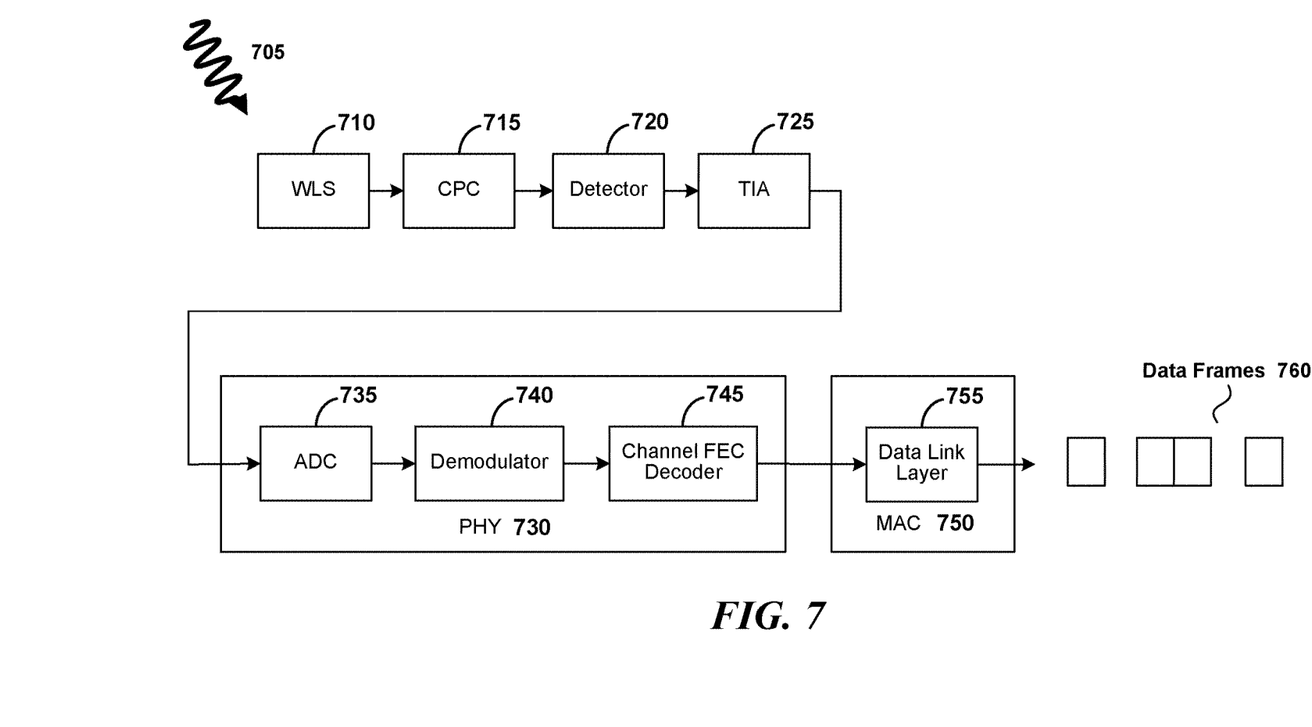
FIG. 7 is a block diagram of an example receiver in accordance with some embodiments.

FIG. 7 is a block diagram of an example WLS receiver, in accordance with some embodiments. A WLS material 710 absorbs a photon 705 having a wavelength in a first wavelength band and emits one or more photons having a wavelength in a second wavelength band. A compound parabolic concentrator (CPC) 715 focuses (and/or otherwise directs) the photons having a wavelength in the second wavelength band to a detector 720. Note that, as described herein, other focusing elements may be used in place of the CPC 715. The output of the detector 720 is coupled to a transimpedance amplifier (TIA) 725 that converts a current signal produced by the detector 720 into a voltage. From this point on, the receiver resembles a standard receiver topology. For example, the output of the TIA 725 is processed by components in a physical layer (PHY) chip 730 (which includes an analog-to-digital converter (ADC) 735, a demodulator 740, and a channel FEC decoder 745) and a media access control (MAC) device 750 (which may include a data link layer component 755). The output of the MAC device 750 is one or more data frames 760.

Computer System

Figure 8:
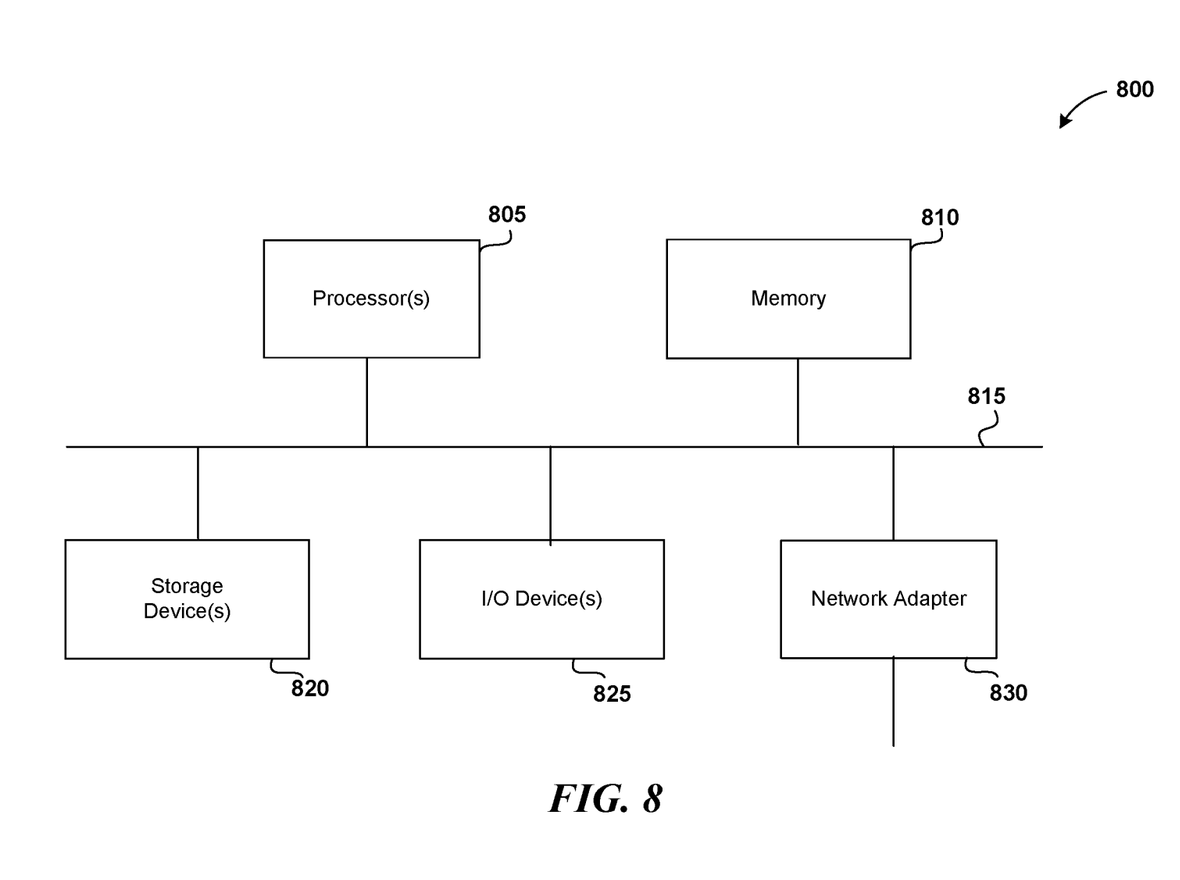
FIG. 8 is a block diagram of a computer system as may be used to implement features of some of the embodiments.

FIG. 8 is a block diagram of a computer system that may be used to implement features of some of the embodiments. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point-to-point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB) (e.g., USB 3.1, USB Type-C, etc.), DisplayPort (e.g., DisplayPort 1.2, DisplayPort 1.3, etc.), IIC (I2C) bus, a High-Definition Multimedia Interface (HDMI) 2.0 bus, or an Institute of Electrical and Electronics Engineers (IEEE) standard 1394 bus, also called "Firewire."

The memory 810 and storage devices 820 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out the actions described above. In some embodiments, such software or firmware may be initially provided to the processors 805 by downloading it from a remote system through the computing system 800 (e.g., via network adapter 830).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatuses, methods, and their related results according to the embodiments of the present disclosure are given above. Note that titles or subtitles may be used in the examples for convenience of a reader, but in no way should they limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An apparatus for communicating with a host system, comprising:
a wavelength-shifting (WLS) material configured to at least partially:
absorb electromagnetic radiation in a first wavelength band transmitted from the host system;
emit electromagnetic radiation in a second wavelength band;
confine the electromagnetic radiation in the second wavelength band to travel within the WLS material; and
direct the electromagnetic radiation in the second wavelength to a detector coupled to the WLS material.

2. The apparatus of claim 1, wherein the WLS material is coupled to a surface of a head-mounted display.

3. The apparatus of claim 1, wherein the WLS material is coupled to a surface of a wearable item.

4. The apparatus of claim 1, wherein the WLS material is included in a wireless receiver.

5. The apparatus of claim 1, wherein the detector detects the electromagnetic radiation in the second wavelength band and produces first signals in response to the detected electromagnetic radiation.

6. The apparatus of claim 5, wherein the first signals are transmitted to a signal processor coupled to the detector, and wherein the signal processor produces second signals at least partially based on the first signals, and wherein the second signals are transmitted to the host system.

7. The apparatus of claim 1, wherein the detector is a first detector, and wherein the WLS material is coupled to a second detector.

8. The apparatus of claim 1, wherein the WLS material includes a curved structure.

9. The apparatus of claim 1, wherein the WLS material includes a flexible structure.

10. The apparatus of claim 1, wherein the WLS material includes a circular structure.

11. The apparatus of claim 1, wherein the WLS material includes a foldable structure.

12. The apparatus of claim 1, wherein the electromagnetic radiation comprises wavelengths in the visible or near-visible light bands.

13. The apparatus of claim 1, wherein the electromagnetic radiation comprises wavelengths in the radio-frequency band, microwave band, or millimeter-wave band.

14. The apparatus of claim 1, wherein the WLS material is coupled to a reflector.

15. The apparatus of claim 14, wherein the reflector is coupled to the WLS material at an end opposite to the detector.

16. The apparatus of claim 14, wherein the reflector is included in a cladding for the WLS material, wherein the cladding comprises one or more materials having specified indices of refraction that allow electromagnetic radiation in the first wavelength band to pass through the cladding but that prevents electromagnetic radiation in the second wavelength band from leaving the cladding.

17. The apparatus of claim 16, wherein electromagnetic radiation in a first wavelength band passes through the cladding and wherein electromagnetic radiation outside of the first wavelength band does not pass through the cladding.

18. The apparatus of claim 14, wherein the reflector is a Bragg reflector within the WLS material and wherein the Bragg reflector enhances emissions of electromagnetic radiation in the second wavelength band in a specified direction in the WLS material.

19. The apparatus of claim 1, wherein the WLS material comprises a plurality of fibers.

20. The apparatus of claim 1, wherein the WLS material comprises a plurality of WLS particles having different absorption and emission wavelength bands.

21. The apparatus of claim 1, wherein the WLS material includes a plurality of WLS layers, wherein each WLS layer absorbs and emits electromagnetic radiation in non-overlapping wavelength bands.

22. The apparatus of claim 1, wherein the WLS material is coupled to a focusing element, and wherein an input of the focusing element is coupled to the WLS material and an output of the focusing element is coupled to the detector, and wherein the focusing element is configured to focus the electromagnetic radiation emitted in the second wavelength band to the detector.

23. The apparatus of claim 22, wherein the focusing element includes a compound parabolic concentrator.

24. The apparatus of claim 22, wherein the focusing element includes another WLS material configured to absorb electromagnetic radiation in the second wavelength band and emit electromagnetic radiation in a third wavelength band, and wherein the detector is configured to detect the electromagnetic radiation in the third wavelength band.

25. The apparatus of claim 22, wherein the focusing element includes a lens.

26. The apparatus of claim 1, wherein the WLS material includes a plurality of solid WLS particles.

27. The apparatus of claim 1, wherein the WLS material includes a liquid having a plurality of dissolved WLS particles.

28. The apparatus of claim 1, wherein the WLS material includes a gas having a plurality of gaseous WLS particles.

29. The apparatus of claim 1, wherein both ends of the WLS material are coupled to the detector.

30. The apparatus of claim 1, wherein the WLS material is coupled to a tapered waveguide, and wherein the tapered waveguide is coupled to a focusing element, and wherein the focusing element is coupled to the detector, and wherein the focusing element is configured to focus the electromagnetic radiation emitted in the second wavelength band to the detector.

31. A processor-implemented method for wireless communications, comprising:
absorbing, by a wavelength-shifting (WLS) material, electromagnetic radiation in a first wavelength band transmitted from a host system;
emitting, by the WLS material, electromagnetic radiation in a second wavelength band corresponding to the absorbed electromagnetic radiation in the first wavelength band;
detecting, by a detector coupled to the WLS material, the electromagnetic radiation in the second wavelength band.

32. The processor-implemented method of claim 31, further comprising:
producing, by the detector, first signals in response to detected electromagnetic radiation; and
producing, by a signal processor of the wireless communication device, second signals from the first signals produced by the detector.

33. The processor-implemented method of claim 31, wherein the WLS material is configured to confine the electromagnetic radiation in the second wavelength band to travel within the WLS material.

34. The processor-implemented method of claim 31, further comprising transmitting, by a radio-frequency transmitter coupled to the WLS material, data to a radio-frequency receiver of the host system.

* * * * *